United States Patent [19]

Withrow et al.

[11] Patent Number: 5,324,340
[45] Date of Patent: Jun. 28, 1994

[54] CONTACT FIXTURE FOR HOT GLASS

[75] Inventors: Shelby M. Withrow, Paradise; Patrick H. Lloyd, Decatur, both of Tex.

[73] Assignee: Union Oil Company of California, Los Angeles, Calif.

[21] Appl. No.: 906,704

[22] Filed: Jun. 30, 1992

[51] Int. Cl.⁵ .................................. C03B 9/453
[52] U.S. Cl. .................... 65/260; 65/374.15; 65/375; 423/448; 428/408
[58] Field of Search ............ 65/260, 239, 241, 374.15, 65/374.13, 374.11, 375; 198/426, 429; 428/408; 423/448

[56] References Cited

U.S. PATENT DOCUMENTS

| | | |
|---|---|---|
| 3,025,638 | 3/1962 | Krawetzke et al. |
| 3,134,660 | 5/1964 | Long .................................. 65/374.15 |
| 3,469,963 | 9/1969 | Beattie .............................. 65/374.15 |
| 4,007,028 | 2/1977 | Bublitz et al. ................. 65/DIG. 13 |
| 4,162,911 | 7/1979 | Mallory ............................... 65/260 |
| 4,199,344 | 4/1980 | Mumford et al. ..................... 65/260 |
| 4,340,413 | 7/1982 | Rowland ............................. 65/375 |
| 4,995,896 | 2/1991 | Denney et al. .................... 65/374.15 |
| 5,037,466 | 8/1991 | Voisine et al. ........................ 65/260 |
| 5,160,015 | 11/1992 | Perry et al. ........................... 65/375 |

FOREIGN PATENT DOCUMENTS 2124572 2/1984 United Kingdom .

Primary Examiner—W. Gary Jones
Assistant Examiner—Steven P. Griffin
Attorney, Agent, or Firm—Charles L. Hartman; William O. Jacobson; Gregory F. Wirzbicki

[57] ABSTRACT

Hot, newly molded glass articles are easily moved using sweepout arms having a plurality of graphite contact members that form a mosaic to present the hot glass piece with a substantially smooth graphite surface.

31 Claims, 1 Drawing Sheet

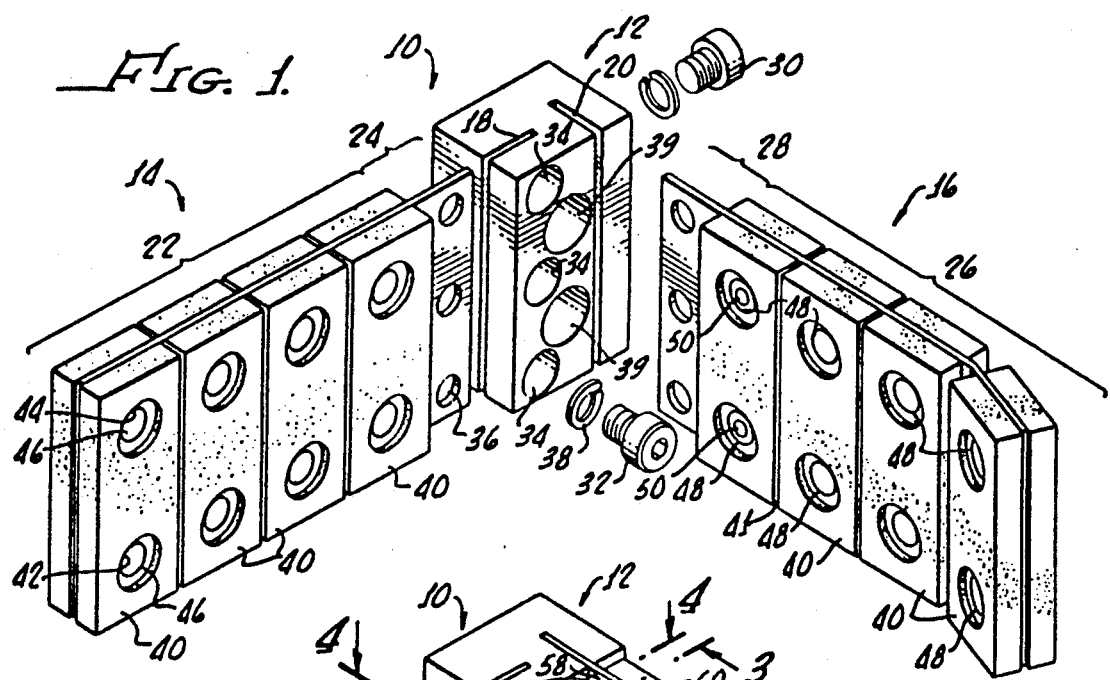
FIG. 1.
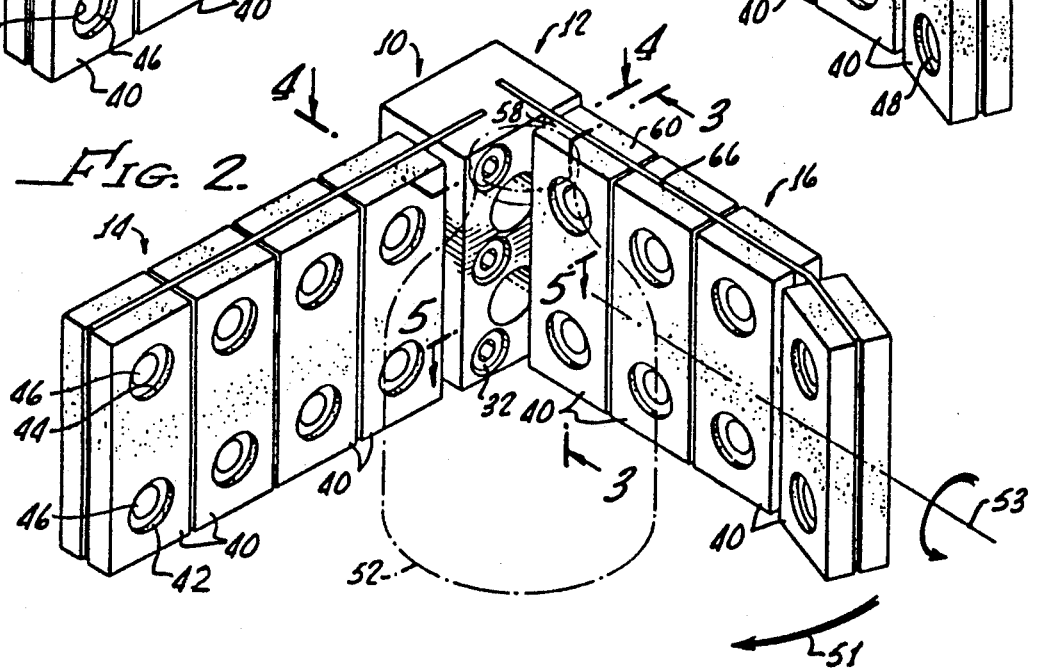
FIG. 2.
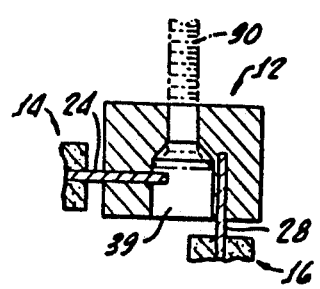
FIG. 3.
FIG. 4.
FIG. 5.

CONTACT FIXTURE FOR HOT GLASS

FIELD OF THE INVENTION

This invention relates generally to the field of glass making. More particularly, this invention relates to fixtures used for directing hot-glass articles moving on a conveyor through a glass-manufacturing process. Most particularly, this invention relates to such a fixture which utilizes a modular contact material.

BACKGROUND OF THE INVENTION

Glass fabricating machines automatically blow a mass of molten glass in a mold to fabricate hot glass articles and then transfer the hot glass article to an oven for annealing. In the period of time between removing the hot glass article from the mold and placing it in the annealing furnace, the glass articles are extremely fragile and susceptible to both thermal and physical damage. Any materials these hot unannealed glass articles touch must be made of materials that will prevent deformation, cracking, or checking of the hot glass. Furthermore, the materials used to handle the hot glass articles must withstand the high temperatures of the hot glass. Stainless steel and other high temperature alloys have been used to handle glass, but metallic materials can cause thermal or physical damage if they contact the hot glass. Therefore, a variety of non-metallic materials have been used to make glass contact material, for example, asbestos, plastics, and graphite. However, each of these materials presents drawbacks to the glass manufacturers.

Although each of the non-metallic materials present problems to its use, graphite is nearly ideal if the problems associated with graphite can be overcome. Although asbestos may be very good for glass handling, strictly from the stand point of its physical properties, its use creates grave environmental and work place safety concerns. Plastics are generally less well suited for high temperature applications and must be specially formulated before they can stand the high temperatures encountered in the hot end process area, and yet they still have a relatively short service life. High quality graphite may be more of an ideal material than others to handle hot glass since graphite has resistance to oxidation, non-abrasive surface integrity, heat resistance, low absorbency and long service life. It is also safe both for the environment and to those who work with it. However, graphite presents several problems that must be overcome before it can be used as a contact material. The first problem graphite presents is that graphite is relatively brittle, which can lead to chipping and cracking. The second problem graphite presents is the difficulty in attaching a graphite contact piece to the supporting body of a fixture, for example, a sweepout arm. Since graphite wears during use, the graphite contact material must be occasionally replaced. Consequently, the article supporting the graphite contact material, or the graphite contact material, must be readily removable, yet the requirement for easy removability frequently results in a supporting body not holding the contact material rigidly and reliably during glass production. The third problem is the need for providing graphite contact material shaped in an array of different shapes and sizes to provide a variety of different fixtures. If these problems could be overcome, then graphite would be ideal for making contact pieces, for example, for the contact pieces used on sweepout arms.

A sweepout arm contacts the hot bottles after they have been removed from a mold and set down on a deadplate, or air pad, to move them from the air pad to a conveyor belt. The bottles then travel to an annealing oven for stress reduction. Therefore, since at least part of the sweepout arm must contact the hot glass, the sweepout arms frequently include non-metallic contact materials mounted on a metallic base plate for contacting the hot glass. Although graphite is the best of the non-metallic materials for contacting hot glass directly, the problems of graphite's brittleness, the difficulty in attaching it to the base plate and the need for a variety of different shapes and sizes of precision machined graphite parts make graphite difficult to use for sweepout arm contact materials.

Therefore, a sweepout arm could advantageously include modular, single size and shape graphite contact members. These members would be rigidly and reliably mounted on the sweepout arm base plate. Such graphite contact plates would ideally be readily replaceable in the event of wear or damage to permit the replacement of the contact material instead of the entire fixture. Making the sweepout arm of modular members would allow only a minimal inventory of sizes and shapes of contact material to be used for all sweepout arms.

SUMMARY OF THE INVENTION

Broadly, this invention provides an apparatus for moving hot, newly molded glass articles using sweepout arms having a plurality of graphite contact members aligned to present the hot glass piece with a substantially smooth, unbroken graphite surface.

One embodiment of this invention is a sweepout arm having a modular design. A removable sweepout arm attaches to a mounting block. The removable sweepout arm has a base plate and a plurality of graphite contact members affixed to the base plate. The contact members form a substantially smooth graphite surface to a hot glass article contacted.

Another embodiment of this invention is an article comprising a graphite body having at least one flat planar surface. The graphite body defines a plurality of apertures penetrating through the body, each aperture suitable for allowing the shank of a rivet to penetrate through the graphite body. The graphite body further defines an annular ledge disposed within each aperture, each annular ledge suitable for retaining a head of the rivet. The annular ledge is disposed deeply enough into the graphite body so that no portion of the head of said rivet received protrudes beyond a flat planar surface of the graphite body. Preferably, the graphite body is suitable for inclusion in a mosaic producible from a plurality of substantially similar graphite bodies. Each of the bodies cooperates with all other of the plurality of substantially similar graphite bodies to present a substantially smooth graphite surface larger in area than the area of a single one of said graphite bodies.

A third embodiment of this invention is a method of attaching graphite contact materials to a sweepout arm. Apertures in a graphite contact members are first aligned on one side of a support body also having alignable apertures. A second graphite contact member is aligned on the other side. Then a rivet having a hollow shank portion is placed through the aperture of the first graphite contact member, the sweepout arm body and the second graphite contact material. Finally, the end of the rivet is rolled over a washer.

Another embodiment of this invention is a sweepout arm assembly having a modular design. The assembly comprises a sweepout assembly mounting block and at least one removable sweepout arm attached to the mounting block. The sweepout arm has a base plate and a plurality of graphite contact members affixed to the base plate. The contact members form a mosaic presenting a substantially smooth graphite surface to a hot glass article contacted.

Yet another embodiment of this invention is a graphite body substantially in the shape of a right rectangular prism. The right rectangular prism formed has a length between about 1 and 2 inches (24.5 mm and 49 mm), a width between about 0.5 and 1 inch (12.25 and 25.4 mm), and a depth between about 0.125 and 0.25 inch (3.06 and 6.35 mm). The graphite body has two substantially identical apertures penetrating through the body. The axes of the apertures are substantially perpendicular to the two sides of largest surface area. The apertures are each defined by two coaxial cylindrical openings of different diameters which form an annular ledge within the body where the two cylindrical openings meet.

BRIEF DESCRIPTION OF THE DRAWINGS

The invention will be more readily understood by reference to the accompanying drawings wherein like numerals refer to like elements and in which:

FIG. 1 is a exploded perspective view of a sweepout arm or assembly of the present invention.

FIG. 2 is a perspective view of the sweepout arm or assembly in its assembled position.

FIG. 3 is a cross-sectional view of the sweepout arm and two graphite contact members mounted thereon, taken along cutting plane 3—3.

FIG. 4 is a sectional view taken along cutting plane 4—4.

FIG. 5 is a sectional view taken along cutting plane 5—5.

DESCRIPTION OF THE PREFERRED EMBODIMENT

Referring now to FIG. 1, a sweepout assembly 10 comprises a mounting block 12, a first sweepout arm assembly 14, and a second sweepout arm assembly 16. The first sweepout arm assembly 14 fits into a first receiving slot 18 cut into the mounting block 12, and the second sweepout arm assembly 16 fits in to a second receiving slot 20 cut into the mounting block 12. The first sweepout arm assembly has a contact member support section 22 and a first attachment blade section 24; the second sweepout arm assembly has a contact member support section 26 and a second attachment blade section 28. The sweepout arm assemblies 14 and 16 are fit into the receiving slots 18 and 20. A bolt 30 and a second bolt 32 fit into a receiving opening 34 and penetrate through the sweepout arm aperture 36 in the attachment blade section to be received by mating threads cut in the mounting block 12. Bolts or similar attachment means are received through the fastening aperture 39, to mount the assembled sweepout arm assembly onto a glass blowing machine. As shown in the Figure, three bolts can be used to hold each sweepout arm onto the mounting block, but any convenient number of bolts can be used. Preferably, a lock washer 38 or similar member is incorporated in the fastener to assure a firm fit.

Each of the sweepout arms 14 and 16 supports a plurality of substantially identical, interchangeable, rectangular graphite contact members 40. Each one of the contact members is a substantially right rectangular prism with three pairs of substantially flat, planar opposing faces. Two apertures 42 and 44 penetrate through the contact member and open onto the opposing pair of the largest area planar surfaces of the graphite body. The graphite contact members fit together on the sweepout arm in mosaic fashion. The small gaps 41 between adjoining contact members allow each member to have some degree of freedom to expand to accommodate thermal expansion. The assembled sweepout arm presents a substantially smooth graphite glass contacting surface. Typically the surface of the assembled mosaic is planar and will not vary more than 0.5 mm from level between any two adjoining contact members, preferably no more than 0.1 mm, and most preferably no more than 0.05 mm. The gaps between adjoining contact members for thermal expansion and the holes for receiving attachment means are small enough that no indentations are made on hot glass articles.

The vertical gaps for thermal expansion must be close tolerance. The hot glass bottle is basically vertical in orientation (See FIG. 2 phantom) so when the contacts the sweepout arm and bottle rolls over the gap the entire side of the bottle contacts the gap. The gap must be smaller than 2 mm, more preferably smaller than 1 mm, most preferably smaller than 0.5 mm to prevent barking or deforming the hot glass. The precise distance apart depends on the type of bottle molded; more thick walled bottles will tolerate a larger gap without damage, but the newer, thinner walled bottles require closer tolerances.

The sweepout arm can be made in any convenient configuration, for example, as shown, either straight or bent. The arms can be made in other conformations, such as curved. Since contact members are mounted on both sides of the sweepout arms, both sides of the sweepout arm can sweepout hot glass, or if only one side of the sweepout arm is used, when the graphite contact material wears out, the sweepout arm can be flipped and the other side used. In this manner the sweepout arm provides maximum service from the graphite contact members used.

The graphite contact members 40 are substantially identical. Each contact member has two apertures drilled therethrough. Each of the apertures comprises two coaxially drilled cylindrical openings, one of smaller dimension and one of larger dimension. The junction of the two openings forms a flat annular ledge or surface within each aperture parallel to the larger planar surfaces of the contact member. The sizes of the cylindrical openings are such that the shank of a rivet having substantially the same dimension as the smaller opening can be inserted therethrough. The larger cylindrical opening accommodates the head 46 of the rivet, providing a sunken recess for the head. When the sweepout arm is assembled, the head of the rivet does not protrude past the surface of the contact member, preventing the metallic rivet head from ever contacting the glass work pieces. The rivet is secured to the sweepout arm assembly by a washer 48 that the rivet penetrates. The end of the rivet 50 is rolled over the washer so that the side of the graphite contact member presents a substantially smooth surface to the hot glass articles.

The dimensions of the graphite contact material are chosen to provide close tolerances between adjoining contact members and to allow heat from the glass work piece to diffuse throughout each contact material without creating a thermal shock. One preferred size of contact members are right rectangular prisms having side length ratios of between about 1:2:4 and 1:4:16, more preferably between about 1:2.5:6.3 and 1:3.5:12.3, and the dimension of the aperture that receives the shank of the rivet is between 0.75 and 1.50 times the smallest linear dimension of the graphite body. The ratio of the smaller diameter aperture to the larger diameter aperture is between about 1:1.5 and 1:3. Typical dimensions of a graphite contact body that withstand the thermal and physical shocks normally encountered in glass manufacturing are about 5 mm:18 mm:44 mm. Each graphite body has apertures of about 4 mm, for the smaller diameter aperture, and about 8 mm, for the larger diameter aperture. The six substantially planar faces can be conveniently machined to a high degree of precision with standard machine tools found in many conventional machine shops. The sides preferably meet at substantially right angles, but round edges and the like may be used. As shown, each contact member is preferably one of a pair of tandemly mounted members. One member of each pair is mounted on each side of the base plate of the arm. Each of the pairs of graphite contact members is attached with rivets that penetrate the apertures in the contact member and the supporting body.

Referring now to FIG. 2, the assembled sweepout assembly 10 is shown to be a left hand assembly, and has the first sweepout arm 14 and the second sweepout arm 16 firmly secured to the mounting block 12 at right angles to each other. Generally, both sweepout arms are mounted on the base in use, although for special uses only one may be employed. The angle between the arms can be varied depending on the use of the sweepout arm assembly. In this manner more customized shapes can be produced using the identical contact members 40 of the invention. The assembled sweepout arm 10 is mounted on a glass making machine which moves the arm outwardly as shown in the figure by the arrow 51. The second arm 16 contacts the hot glass bottle 52 and moves it onto the conveyor to the annealing oven. The sweepout arm assembly 10 can be flipped or rotated 180° around an axis 53 through the arms as shown by the arrow 55 to provide the mirror image sweepout arm assembly, the right hand assembly, that is, an assembly that would have an angled arm where the straight arm is shown in the drawing and a straight arm where an angled arm is shown in the drawing. In this manner one sweepout arm assembly can provide two distinctly different replacement parts.

Referring now to FIG. 3, rivets 46 retain the pairs of tandemly mounted contact members 58 and 60. A first contact member 58 of the pair is joined to a second contact member 60 of the pair by the rivets 46 that penetrate apertures 62 and 64 in the sweepout arm base plate 66. Each of the contact members 46 presents a flat, planar face that abuts the side wall of sweepout arm base plate. The rivets 46 secure the contact member to the sweepout arm base plate 66, but not so tightly to give rise to danger of contact member breakage. Each rivet has a head 68 that is attached to a shank 70 forming a shoulder 72 that allows the head to engage a ledge 74 disposed within the aperture of the graphite contact member. The flat annular ledge is cut onto each contact member during construction at the junction of two coaxial apertures: a first cylindrical hole 76, and a second hole 78 of smaller diameter. The rivet is secured by rolling the rivet end 80 over a washer 48 in the aperture of the second contact member 60. The second aperture 76 receives the washer, and the first aperture 86 receives the head of the rivet. The two apertures 76 and 84 both provide wells allowing both of the graphite contact members of each pair to present a smooth, flat face to the hot glass articles. No part of the rivet extends beyond the flat surface of the contact member so no metal on the sweepout arm will contact hot glass during the manufacturing process.

The sweepout arms of the present invention are made by inserting rivets 46 through apertures in the graphite contact members 58 and 60 and the sweepout arm base plate 66. The contact members are attached after aligning the second hole 78 in contact member 58 and the second hole in contact member 60 with the apertures, for example 62, in the sweepout arm base plate 66. The aligned apertures then receive the shank 70 of the rivets 46. Preferably, the shank of the rivet is a hollow tube. The head of the rivet 68 rests securely on the annular ledge 74 inside formed by the junction of the first cylindrical opening and the second cylindrical opening. The head of the rivet is disposed deeply enough into the body so that no portion of a head of a rivet so received protrudes beyond the flat planar surface formed by the surface of the graphite contact member. A washer 48 is placed in the second aperture, the one not containing the head, and the hollow portion of the rivet is rolled over the washer placed over the shank of the rivet. After rolling the end of the rivet over the washer securing the graphite contact members, neither the end of the rivet nor the washer extends beyond the planar surface of the graphite contact material. Rolling the ends of the hollow rivets over a washer allows the attachment to have some degree of flexibility to compensate for uneven thermal expansion.

Referring to FIG. 4, the first receiving slot 18 receives the blade of the first sweepout arm 24 and the second receiving slot 20 receives the blade of the second sweepout arm 28. The bolt holes 24 receive the bolts 30 and 32, and the bolts 30 and 32 are threadably mated to the base plate 12. Although bolts are shown as the preferred embodiments, other retaining means, for example, screws, lock and key assemblies, and the like, can be used. The removable retaining means are recessed within the openings 34 of the mounting block.

Referring to FIG. 5, each of the fastening apertures 39 accommodate a bolt 90 (shown in phantom) that attaches the mounting block onto the hot glass manufacturing equipment. The attachment blade 24 of the first sweepout arm 14 extends through into the fastening aperture, trapping the bolt. The second sweepout arm 16, mounted parallel to the hole walls, does not penetrate though into the sidewall of the fastening aperture. The fastening aperture is a counter sunk screw receiving aperture that receives the bolt 90. Although any conventional type screw can be used for the bolt 90, it is preferred that the bolt be a flat head machine screw that receives a hexagonal wrench, for example, an Allen wrench, to allow easy placement and removal of the sweepout arm assembly. The bolt can rotate to allow fastening but it can not be removed from the mounting block 12 without first removing the arm 14. If the bolt works loose during manufacture of glass bottles, it will be retained in the base rather than falling into the machine. In use, the mounting block is secured to the hot glass equipment by aligning the bolt with its receiving hole in the hot glass manufacturing equipment and then rotating the trapped bolt in the mounting block to secure it to the glass manufacturing equipment.

In the preferred embodiments, the sweepout arm of the present invention includes modular graphite contact members of substantially the identical size and shape. A manufacturer can economically produce small quantities of the modular sweepout arm of the present invention. The use of the sweepout arm, with its modular contact members, results in a decreased need for an inventory of a large variety of different replacement parts and decreased frequency in replacing the contact material. The modular design of the contact members permits machining to close tolerances without the need for elaborate, complex machinery for precision cutting. Thus, the design ensures accurate and precise setup on the hot glass conveying equipment. The modular design of the sweepout arm assembly can be used advantageously in a variety of other locations to perform a variety of different jobs, in addition to the sweepout arm function.

The modular design also helps reduce the problems caused by cracking and chipping of the graphite contact members. Cracking and chipping of monolithic hot glass contact material caused one of the major modes of failures in the prior art sweepout arm assemblies. Cracking and chipping are not entirely prevented by the present invention, but their adverse effect on the assembly line is greatly reduced. The present invention utilizes a plurality of substantially identical contact members of reduced size, compared to those generally in current use, permitting spacing between neighboring contact members to allow for thermal expansion. If a contact member cracks, chips, or is otherwise damaged, only the damaged contact member need be replaced, rather than the entire assembly as required in the prior art. Attachment means such as bolts, screws, and, preferably, rivets hold the contact member in place more rigidly and reliably on the base plate. The attachment means are selected to have thermal expansion properties similar to those of graphite up to about 250° F., preferably up to about 300° F., and most preferably up to about 500° F. Selection of such attachment means further prevents cracking or chipping caused by unequal thermal expansion of the graphite and the rivet. The base plate and the graphite contact members are selected to have approximately equal thermal expansion properties below about 250° F.

Although this invention has been primarily described by references to embodiments thereof, it is evident that the foregoing description suggest many alternatives, modifications, and variations to those skilled in the art. Accordingly, the spirit and scope of the appended claims are intended to embrace within the invention all such alternatives, modifications, and variations.

We claim:

1. A sweepout arm removably attachable to a mounting block, said sweepout arm having a modular design comprising:
    a base plate; and
    a plurality of graphite contact members affixed to the base plate, the contact members forming a mosaic presenting a substantially aligned graphite surface to a hot glass article contacted.

2. The sweepout arm of claim 1 wherein each of the contact members has a substantially identical configuration.

3. The sweepout arm assembly of claim 1 wherein the contact members are of a substantially rectangular configuration.

4. The sweepout arm of claim 1 wherein the plurality of contact members are spaced far enough apart to allow for thermal expansion and close enough to prevent barking the hot glass articles.

5. The sweepout arm of claim 1 wherein the base plate and the graphite contact members have approximately equal thermal expansion properties below about 250° F.

6. The sweepout arm of claim 1 wherein the sweepout arm is attached to a mounting block.

7. The sweepout arm of claim 6 wherein the mounting block can receive more than one sweepout arm.

8. A sweepout arm removably attachable to a mounting block, said sweepout arm having a modular design for contacting a hot glass article,
    said sweepout arm comprising a base plate and a plurality of graphite contact members affixed to the base plate, the contact members forming a mosaic graphite surface contactable with the hot glass article and wherein the contact members all comprise right rectangular graphite bodies having three pairs of opposing machined planar faces.

9. An article comprising;
    a graphite body having at least one substantially planar surface having a planar surface area, the body defining a plurality of apertures suitable for accepting a shank and a head of a rivet, the graphite body further defining an annular ledge disposed within each aperture, each annular ledge suitable for retaining a head of the rivet having a head height, the head height of said rivet head being less than a distance from the ledge to the planar surface so that a plurality of substantially similar graphite bodies, by cooperation between each of the plurality of substantially similar graphite bodies, presents a substantially aligned graphite surface larger in area than the planar surface area of a single one of said graphite bodies.

10. The article of claim 9 wherein the aligned graphite surface includes a plurality of substantially similar graphite bodies spaced far enough apart to allow for thermal expansion of the graphite bodies and closely enough together to prevent marking hot glass.

11. The article of claim 9 wherein the substantially planar surface formed by a plurality of graphite bodies is substantially non-glass deformable.

12. The article of claim 9 wherein the graphite body forms a right rectangular prism having side length ratio of dimensions between 1:2:4 and 1:4:16.

13. An article comprising:
    a graphite body having at least one planar surface, the body defining a plurality of apertures, the graphite body further defining an annular ledge disposed within each aperture substantially parallel to one of said planar surfaces, each annular ledge suitable for retaining a head of a rivet having a head height, the head height of said rivet head less than a distance from the ledge to said one parallel planar surface so that a plurality of substantially similar graphite bodies, by cooperation between each of the plurality of substantially similar graphite bodies, presents a substantially aligned graphite surface having a difference in level between any two adjoining graphite bodies of less than 0.5 mm., and larger in area than the area of a single one of said graphite bodies.

14. A sweepout arm assembly having a modular design comprising:
a sweepout assembly mounting block;
at least one sweepout arm removably attached to the mounting block, the arm further comprising a base plate and a plurality of graphite contact members affixed to the base plate, the contact members forming a mosaic presenting a substantially aligned graphite surface to a hot glass article contacted.

15. The sweepout arm assembly of claim 14 wherein the mounting block defines apertures receiving freely rotating fastening means trapped by at least one of the sweepout arms.

16. The sweepout arm assembly of claim 14 wherein the contact members all comprise right rectangular graphite bodies having three pairs of opposing machined planar faces.

17. The sweepout arm assembly of claim 16 wherein the contact members further comprise a body penetrated by a plurality of apertures opening onto a pair of opposing planar faces comprising a first cylindrical opening and a second coaxial cylindrical opening having a greater radius than the first cylindrical opening.

18. The sweepout arm assembly of claim 17 wherein the body further comprises at least one substantially annular boundary ledge, formed by the junction of the first cylindrical opening and the second cylindrical opening, disposed in the body.

19. The sweepout arm assembly of claim 14 wherein the mounting block can receive more than one sweepout arm.

20. The sweepout arm assembly of claim 14 wherein the plurality of contact members are spaced far enough apart to allow for thermal expansion and close enough to prevent barking the hot glass articles.

21. The sweepout arm assembly of claim 14 wherein the base plate and the graphite contact members are attached by means having approximately equal thermal expansion properties below about 250° F. as said graphite contact members.

22. A graphite body substantially in the shape of a right rectangular prism having a length between about 1 and 2 inches, a width between about 0.5 and 1 inch, and a depth between about 0.125 and 0.25 inch, said graphite body having two substantially identical apertures, the apertures having axes substantially perpendicular to two sides of largest surface area, said apertures each being defined by two coaxial cylindrical openings of different diameters around said axes which form an annular ledge within the body where the two coaxial cylindrical openings meet.

23. A graphite body with at least one surface having a plurality of apertures penetrating into the surface and through the body, at least two of said apertures defining a circumferential ledge within the body.

24. The graphite body of claim 23 wherein the body has a shape and dimensions substantially comprising a right rectangular prism.

25. The graphite body of claim 24 wherein the dimensions of the right rectangular prism comprise a length between about 1 and 2 inches, a width between about 0.5 and 1 inch, and a depth between about 0.125 and 0.25 inch.

26. The graphite body of claim 25 wherein said graphite body defines two substantially identical apertures.

27. The graphite body of claim 26 wherein the apertures have axes which meet two sides of the body having areas larger than other sides substantially perpendicularly.

28. The graphite body of claim 27 wherein said apertures comprise two coaxial cylindrical openings of different diameters which form an annular ledge within the body where the two cylindrical openings meet.

29. The graphite body of claim 23 wherein said graphite body defines two substantially identical apertures.

30. The graphite body of claim 29 wherein the the apertures have axes which meet two sides of the body having areas larger than other sides substantially perpendicularly.

31. A method of use of a graphite body substantially having a shape of a right rectangular prism and having a length between about 1 and 2 inches, a width between about 0.5 and 1 inch, and a depth between about 0.125 and 0.25 inch, said graphite body having two substantially identical apertures having axes substantially perpendicular to two sides having surface areas larger than other sides, said apertures each being defined by two coaxial cylindrical openings of different diameters which form an annular ledge within the body where the two coaxial cylindrical openings meet comprising:
mounting a plurality of graphite bodies on a planar surface to produce a substantially planar graphite surface suitable for contacting hot glass.

* * * * *